United States Patent [19]

Nishimura et al.

[11] Patent Number: 5,061,570
[45] Date of Patent: Oct. 29, 1991

[54] MAGNETIC RECORDING MEDIUM COMPRISING MAGNETIC PARTICLES AND A POLYESTER RESIN HAVING AN IMINOSULFONYL GROUP

[75] Inventors: Akihiro Nishimura, Los Altos, Calif.; Kazuyuki Hayashi, Hiroshima, Japan; Keisuke Iwasaki, Hiroshima, Japan; Yasuyuki Tanaka, Hiroshima, Japan; Hiroko Itamochi, Hiroshima, Japan

[73] Assignee: Toda Kogyo Corp., Hiroshima, Japan

[21] Appl. No.: 594,159

[22] Filed: Oct. 9, 1990

[30] Foreign Application Priority Data

Oct. 13, 1989 [JP] Japan ................................. 1-267466

[51] Int. Cl.⁵ .............................................. G11B 23/00
[52] U.S. Cl. ................................... 428/480; 428/694; 428/900
[58] Field of Search ....................... 428/900, 694, 480; 528/290, 295

[56] References Cited

U.S. PATENT DOCUMENTS

| | | | |
|---|---|---|---|
| 3,650,828 | 3/1972 | Higashi et al. ........................ | 117/235 |
| 4,361,636 | 11/1982 | Isaacson et al. ...................... | 430/32 |
| 4,401,787 | 8/1983 | Chen ................................... | 524/603 |
| 4,795,672 | 1/1989 | Takeda et al. ........................ | 428/216 |

Primary Examiner—Merrell C. Cashion, Jr.
Assistant Examiner—Stevan A. Resan
Attorney, Agent, or Firm—Nixon & Vanderhye

[57] ABSTRACT

A magnetic recording medium comprising a substrate, and a magnetic recording layer composed of a coating composition containing a binder resin and magnetic particles, the binder resin being a polyester having an iminosulfonyl group, is disclosed. The magnetic recording medium has excellent magnetic characteristics.

8 Claims, 1 Drawing Sheet

MAGNETIC RECORDING MEDIUM COMPRISING MAGNETIC PARTICLES AND A POLYESTER RESIN HAVING AN IMINOSULFONYL GROUP

BACKGROUND OF THE INVENTION

The present invention relates to a magnetic recording medium which comprises a substrate and a magnetic recording layer composed of a coating composition containing a binder resin and magnetic particles and, more particularly, to a magnetic recording medium which is excellent in the orientation property and the packing property of the magnetic particles in a coating film (magnetic recording layer) due to the excellent dispersibility of the magnetic particles in a vehicle, and is produced by the manufacturing process in which the amount of dispersant used can be reduced, or in some cases, no dispersant is necessary.

With progressing miniaturization, weight reduction and recordable-time prolongation of video or audio magnetic recording and reproducing devices in recent years, magnetic recording media such as a magnetic tape and a magnetic disk have been strongly required to have a higher performance, namely, to record at a higher recording density and to lower the noise level.

Especially, since the demands for video tapes having a higher picture quality has been increasingly strong, the frequencies of carrier signals recorded are higher than in a conventional video tape. In other words, the carrier signals recorded are shifted to a short-wavelength region and, as a result, the magnetization depth from the surface of a magnetic tape becomes greatly small.

Accordingly, the efforts to keep and further improve the high output characteristics, in particular, the CN ratio of short-wavelength signals have been made. For this purpose, it is necessary (1) to produce very fine magnetic particles, (2) to make the surface of the magnetic coating film smooth, (3) to make the magnetic coating film thin, and (4) to improve the dispersibility of the magnetic particles.

This fact is described in, for example, DEVELOPMENT OF MAGNETIC MATERIALS AND TECHNIQUE OF IMPROVING THE DISPERSION PROPERTY OF MAGNETIC POWDER (1982), published by K. K. Sogo Gijutsu Kaihatsu Center, p. 312: "The condition for high-density recording in a coating type tape is that it is possible to keep the high output characteristics with respect to a short-wavelength signal at a low noise level. For this purpose, it is necessary that both the coercive force (Hc) and the residual magnetism (Br) are large, and that the thickness of the coating film is thin"; and *Nikkei Electronics* (1976), May 3, pp. 82 to 105: "As the physical quantities related to the SN ratio (CN ratio) of a luminance signal, there are average number of particles per unit volume, the dispersing state (dispersibility) and the smoothness of the surface thereof. If the smoothness and the dispersibility are constant, since the SN ratio becomes higher in proportion to the root of the average number of particles, the smaller volume and the higher packing density magnetic particles have, the more advantageous."

As described above, in order to improve the high output characteristics with respect to short-wavelength signals, not only are magnetic particles required to have a high dispersibility but also the magnetic coating film is required to be thin. When the magnetic coating film is made thin, it is essential to improve the packing property of the magnetic particles in order to keep or improve the other properties. For this purpose, it is necessary to reduce the amount of component other than the magnetic particles, in particular, dispersant, lubricant, etc. as much as possible, or in some cases, to dispense with the need of any such component. Thus, the development of a binder having an excellent resin adsorptivity to the magnetic particles is strongly demanded.

On the other hand, it is known that the noise level of a magnetic recording medium has a tendency to be lowered as the particle size of the magnetic particles used becomes smaller, namely, the specific surface area becomes larger, as shown, for example, in FIG. 3 on page 27, lines 23 to 29 in the REPORTS OF TECHNICAL RESEARCHES OF THE INSTITUTES OF ELECTRONICS AND COMMUNICATION ENGINEERS OF JAPAN MR 81-11. Recently, the particle size of magnetic particles has a tendency to be increasingly reduced. In this report, FIG. 3 shows the relationship between the particle size of Co-coated acicular maghemite particles and the noise level, and it is clear from FIG. 3 that as the particle size becomes small (the specific surface area of the particles becomes large), the noise level lowers linearly. It is known, however, that as the particle size of the magnetic particles becomes small, the dispersibility of the magnetic particles in a vehicle is lowered, resulting in the deterioration of the orientation property and the packing property in the coating film.

As a method of improving the dispersibility of magnetic particles in a vehicle, methods of adding various kinds of dispersants, of using various dispersing machines, of improving various properties of the magnetic particles, and of improving various properties of a binder resin (varying the kinds of a binder resin) are known.

Especially, the kinds of a binder resin is an important factor for influencing the dispersion of magnetic particles in a vehicle. This fact is described in DEVELOPMENT OF MAGNETIC MATERIALS AND TECHNIQUE OF IMPROVING THE DISPERSION PROPERTY OF MAGNETIC POWDER, p. 65: "The influence of a binder on the dispersion of magnetic powder is large. For example, even if the dispersing machine used has a high dispersion efficiency, in the case where the dispersibility of the binder is low, the magnetic particles in the coating do not disperse ... The dispersibility is greatly different depending upon the kinds of a binder."

As a conventional binder resin, nitrocellulose, a polyvinylidene chloride, a vinyl chloride-vinyl acetate copolymer, a styrene-butadien copolymer, a polymethyl methacrylate, a vinylidene chloride-methyl methacrylate copolymer, a polyurethane and an epoxy resin are generally used.

As a magnetic recording medium with the magnetic particles having an improved dispersibility in a vehicle, a magnetic recording medium having a magnetic recording layer which contains fine magnetic particles uniformly dispersed in a polyester which has a reducing viscosity of not less than 0.2 and is produced by using a dicarboxylic acid having a sulfonic acid metal base as a copolymerizing component in the ratio of 0.3 to 7.0 mol % based on the total carboxylic acid component, is exemplified [Japanese Patent Application Laid-Open (KOKAI) No. 54-28603 (1979)].

The strongest demand in the manufacture of a magnetic recording medium is the improvement of the dispersibility of magnetic particles in a vehicle and the increase in the resin content adsorbed to the magnetic particles. Even if the polyester produced by using as a copolymerizing component a dicarboxylic acid containing a sulfonic acid metal base [described in Japanese Patent Application Laid-Open (KOKAI) No. 54-28603 (1979)] is used, the dispersibility of the magnetic particles in a vehicle cannot be said satisfactory and the resin adsorption is small. Furthermore, it is pointed out that the method of improving the dispersibility of the magnetic particles in a vehicle by adding a large amount of dispersant is disadvantageous in that it is impossible to improve the packing property of the magnetic particles and in that the dispersant remaining in the coating film (magnetic recording layer) influences the surface property of the coating layer such as the viscosity, which may lead to defective operation due to a change in the ambient temperature.

Therefore, the offer of a magnetic recording medium and a method of producing the same which allows the amount of dispersant used in the manufacturing process to be reduced as much as possible, or in some cases, dispenses with the need of any dispersant due to an excellent dispersibility of magnetic particles in a vehicle and the excellent packing property of the magnetic particles in the coating film (magnetic recording layer) which is brought about by the large resin adsorption of the magnetic particles, is strongly demanded.

As a result of the present inventors' studies on a magnetic recording medium which allows the amount of dispersant used in the manufacturing process to be reduced as much as possible, or in some cases, dispenses with the need of any dispersant, it has been found that when a substrate is coated with a coating composition containing a polyester having an iminosulfonyl group as a binder and magnetic particles so as to form a magnetic recording layer thereon, the dispersibility of the magnetic particles in a vehicle is very excellent and the packing property of the magnetic particles in the resultant coating film (magnetic recording layer) is very excellent. The present invention has been achieved on the basis of this finding.

SUMMARY OF THE INVENTION

In a first aspect of the present invention, there is provided a magnetic recording medium comprising a substrate, and a magnetic recording layer composed of a coating composition containing a binder resin and magnetic particles, the binder resin being a polyester having an iminosulfonyl group.

In a second aspect of the present invention, there is provided a magnetic recording medium comprising a substrate, and a magnetic recording layer composed of a coating composition containing a binder resin and magnetic particles, the binder resin being a polyester having an iminosulfonyl group and the specific surface area of the magnetic particles being not less than 30 m$^2$/g.

DETAILED DESCRIPTION OF THE INVENTION

Figure 1:
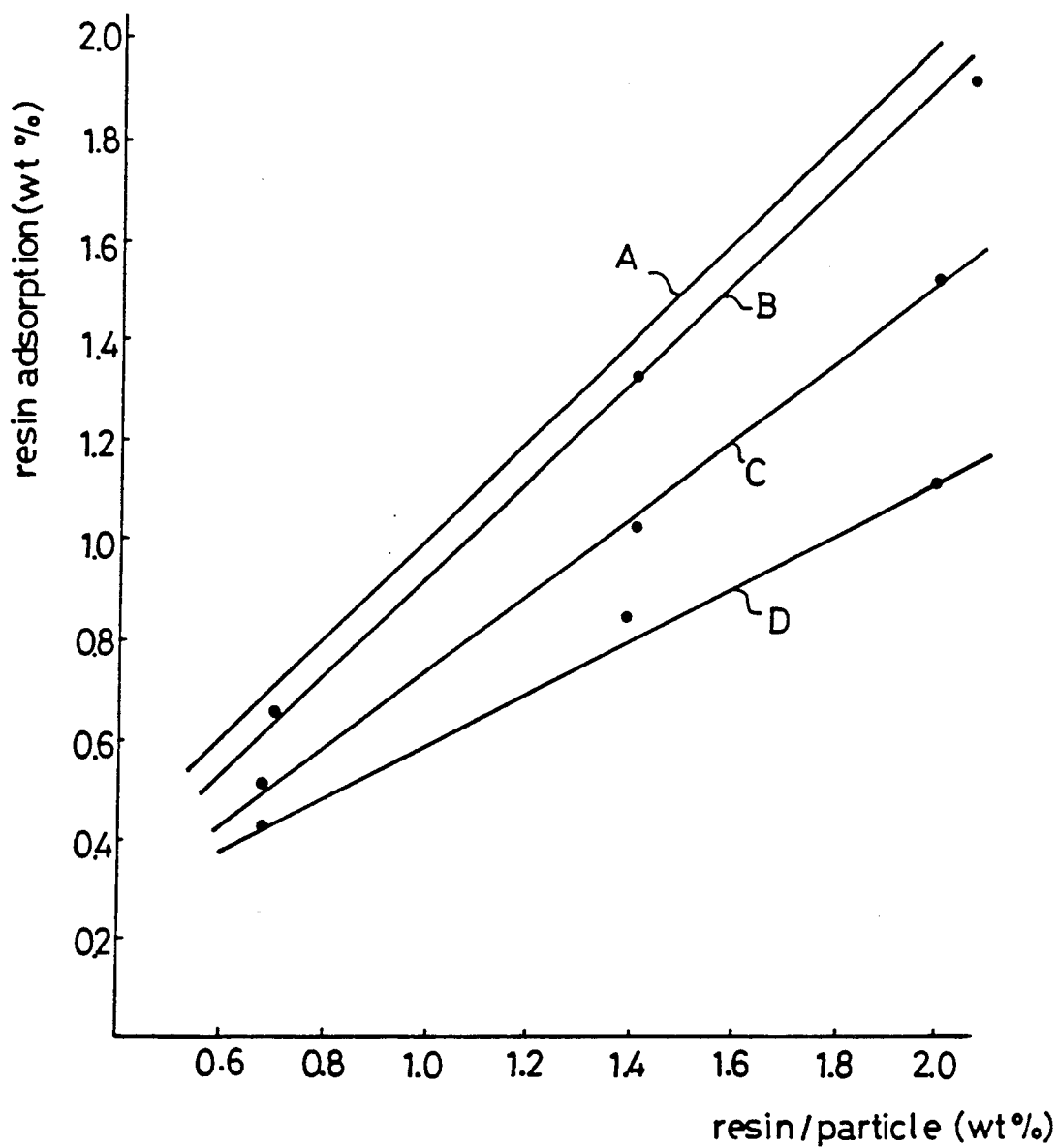
FIG. 1 shows the relationship between the ratio of various binder resins added to acicular Co-coated maghemite particles having a specific surface area of 40 m$^2$/g and the resin adsorption of the Co-coated maghemite particles.

As the maghemite particles in the present invention, any of the magnetic iron oxide particles such as maghemite particles; magnetite particles; Berthollide compounds (FeO$_X$·Fe$_2$O$_3$, $0<X<1$); these magnetic iron oxide particles containing an element other than Fe, e.g., Co, B, Al, Ni, P, Si and/or Zn; these magnetic iron oxide particles coated with Co or the like; iron-based metal magnetic particles; iron-based alloy magnetic particles containing other than Fe, e.g., Co, Ni, Al, P and/or B; plate-like Ba ferrite particles; and plate-like composite ferrite particles obtained by adding a bivalent metal such as Co, Ni, and/or Zn, and a tetravalent metal such as Ti, Sn and/or Zr as a coercive reducing agent to the plate-like Ba ferrite particles may be used. The shape of the magnetic particles is not specified and may be acicular, spindle-like, cubic, or plate-like.

The size of the magnetic particles is not restricted but it is ordinarily not more than 0.5 μm, preferably not more than 0.3 μm, more preferably 0.05 to 0.2 μm.

The specific surface area of the magnetic particles is not particularly restricted but it is preferably not less than 30 m$^2$/g, more preferably 40 to 70 m$^2$/g.

As a binder resin in the present invention, a polyester having an iminosulfonyl group is used. The polyester in the present invention is an unsaturated polyester obtained by condensing a dicarboxylic acid having a double bond in a molecule such as maleic acid and an anhydride thereof, and fumaric acid with a dihydric alcohol such as ethylene glycol and propylene glycol. A dicarboxylic acid having an iminosulfonyl group may be used as a condensation ingredient. The average number molecular weight of the polyester is preferably 10,000 to 40,000, more preferably 10,000 to 20,000. The melt viscosity at 200° C. of the polyester is preferably 1,000 to 50,000 poise, more preferably 2,000 to 42,000 poise. The glass transition temperature of the polyester is preferably 20° to 70° C., more preferably 25° to 60° C. The usable polyester having an iminosulfonyl group may be exemplified by AQ29S, AQ55S and AQ38S produced by Eastman Kodak.

The weight ratio of the magnetic particles to the binder resin in the magnetic recording layer is preferably 75:25 to 92:8, more preferably 80:20 to 85:15.

Ordinarily used additives such as a lubricant, a polishing agent, an antistatic agent, etc. may be added to the coating composition.

The content of the additives in the recording layer is preferably not more than 7 wt %, more preferably not more than 5 wt %.

As the material for the substrate in the present invention, a synthetic resin film such as polyethylene terephthalate, polyethylene, polypropylene, polycarbonate, polyethylene naphthalate, polyamide, polyamidoimide, polyimide and polysulfone, a metal foil or plate such as aluminum and stainless steel and various kinds of papers, which are now generally used in the manufacture of a magnetic recording medium, are usable.

A magnetic recording medium according to the present invention can be obtained by forming a coating film on a substrate by coating the substrate with a coating composition containing a binder resin and magnetic particles by an ordinary method.

FIG. 1 shows the relationship between the ratio of various binder resins added to acicular Co-coated maghemite particles having a specific surface area of 40 m$^2$/g, a major axis diameter of 0.18 μm, an aspect ratio (major axis/minor axis) of 6.0, Co content (Co/total) of 4.2 wt %, a coercive force of 840 Oe and a saturation magnetization of 76.8 emu/g, and the resin adsorption of the Co-coated maghemite particles. In FIG. 1, the straight line A shows the theoretical value of the resin adsorption when the total amount of binder resin added is adsorbed to the Co-coated maghemite particles, the straight lines B to D show the values when a polyester having an iminosulfonyl group (AQ55S, trade name, produced by Eastman Kodak), a polyester produced by using a dicarboxylic acid having a sulfonic acid metal base as a copolymerizing component (Vyron-280, trade name, produced by Toyo Spinning Co., Ltd.), and a vinylidene chloride resin containing sodium sulfonate (VAGH, trade name, produced by U.C.C., Ltd.), respectively, were used. The resin adsorption in FIG. 1 was measured without adding any dispersant, as will be described later in detail. That the resin adsorption was as large as possible and approximate to the theoretical value means that it is possible to reduce the amount of binder resin added so as to obtain the same resin adsorption. In other words, it means that the amount of magnetic articles packed per volume is large.

As shown in FIG. 1, in the case of using a polyester having an iminosulfonyl group in accordance with the present invention, the resin adsorption approximate to the theoretical value is obtained even without adding a dispersant. This fact means that the dispersibility of the magnetic particles in a vehicle is very excellent and that the packing property of the magnetic particles in the coating film (magnetic recording layer) is excellent due to the high resin adsorption of the magnetic particles. It is possible to reduce the amount of dispersant or dispense with the need of any dispersant in the manufacture of a magnetic recording medium.

Additionally, FIG. 1 shows the resin adsorption in the case of using Co-coated maghemite particles as the magnetic particles, but a similar trend is observed in the case of using iron-based metal or iron-based alloy magnetic particles, plate-like Ba ferrite particles, etc. as the magnetic particles.

The resin adsorption to the magnetic particles in the present invention is preferably not less than 1.65 wt %, more preferably not less than 1.75 wt %.

The squareness ratio (Br/Bm) of the magnetic recording medium is preferably not less than 0.85. In the case of using acicular magnetic particles, the degree of orientation thereof is preferably not less than 2.7, more preferably not less than 2.9.

The resin adsorption to the binder resin used in the present invention is larger than that to the conventional binder resin.

The magnetic recording medium of the present invention is superior in the residual flux density, the squareness ratio (Br/Bm) and the degree of orientation to that in which the magnetic recording layer contains the conventional binder resin.

In the manufacturing process of the magnetic recording medium of the present invention, the amount of dispersant can be reduced, or in some cases, no dispersant is necessary, because the dispersibility of the magnetic particles in a vehicle is very excellent and the packing property of the magnetic particles in the coating film (magnetic recording layer) is excellent due to the high resin adsorption to the magnetic particles.

In addition, when fine magnetic particles having a specific surface area of not less than 30 m$^2$/g, in particular, not less than 40 m$^2$/g are used for a magnetic recording medium according to the present invention, the orientation property of the magnetic particles in the coating film (magnetic recording layer) and the packing property of the magnetic particles are more excellent, so that the magnetic recording medium produced is more suitable as a magnetic recording medium for high-density recording and for recording at a low noise level.

[EXAMPLES]

The present invention will be explained hereinbelow with reference to the following examples and comparative examples.

The major axial diameter and the aspect ratio (major axis:minor axis) of the particles in each of the following examples and comparative examples are expressed by the average values measured in electron microphotographs and the specific surface area was expressed by the value measured by a BET method.

The magnetic characteristics of the magnetic particles were measured by using an vibrating sample magnetometer (VSM-3S-15, produced by Toei Kogyo K. K.) and applying an external magnetic field up to 10 KOe.

The resin adsorption based on the weight of the magnetic particles was calculated from the difference between the amount of the resin in the resin liquid having the following composition and the amount of the resin in the supernatant liquid of the coating obtained by charging 20 g of magnetic particles, 48 g of the resin liquid and 50 g of 2-mmφ glass beads into a 140 ml glass bottle and dispersing them with a paint conditioner for 60 minutes and subjected to centrifugal separation. The amounts of resins were measured as the weights of the nonvolatile contents in the liquids.

| Composition of Resin Liquid | | | |
|---|---|---|---|
| Resin/particle | 0.7 wt % | 1.4 wt % | 2 wt % |
| Solid resin content | 0.14 g | 0.28 g | 0.40 g |
| Cyclohexanone | 47.86 g | 47.72 g | 47.60 g |

In the above-described experiments shown in FIG. 1, the resin adsorptions were plotted when the resin/particle ratios in the resin liquid were 0.7 wt %, 1.4 wt % and 2 wt %, respectively. In the following examples and comparative examples, the resin adsorptions are shown when the resin/particle ratio was 2 wt %.

The coercive force, the residual flux density and the squareness ratio in the case of manufacturing a magnetic recording medium produced by using plate-like Ba ferrite fine particles as the magnetic particles were measured in the perpendicular direction of the magnetic recording medium with the magnetic field oriented perpendicularly to the recording surface. The coercive force was expressed by the measured value, and the residual flux density and the squareness ratio were expressed by the values obtained by the diamagnetic field correction of the measured values.

EXAMPLE 1

A binder resin, AQ55S produced by Eastman Kodak, and a Co-coated acicular γ-Fe$_2$O$_3$ particles (Co/total amount=4.21 wt %) having a major axial diameter of 0.18 μm, an aspect ratio (major axis: minor axis) of 6.0, a coercive force of 840 Oe, a saturation magnetization of 76.8 emu/g and the (AQ55S) resin adsorption of 1.89 wt % were used.

100 parts by weight of the above-described Co-coated acicular γ-Fe$_2$O$_3$ particles, 20 parts by weight of AQ55S produced by Eastman Kodak, 60 parts by weight of cyclohexanone, 1 part by weight of Al$_2$O$_3$ powder and 2 parts by weight of carbon black were kneaded by a kneader for 90 minutes. Thereafter, 90 parts by weight of cyclohexanone was added to the kneaded material to dilute it, and mixed and dispersed by a sand grinder for 3 hours.

80 parts by weight of cyclohexanone was further added to the mixed and dispersed material and mixed for 30 minutes. The mixture was filtered and the filtrate was mixed with 3 parts by weight of Coronate L (trifunctional low-molecular isocyanate compound, produced by Nihon Polyurethane Kogyo) to obtain a magnetic paint.

The magnetic paint was applied to polyester film having a thickness of 12 μm and dried to produce a magnetic layer of 4 μm thick. The polyester film was calendered and then cut into a width of 12.7 mm.

The magnetic characteristics of the magnetic recording medium obtained are shown in Table 1.

EXAMPLES 2 TO 4, COMPARATIVE EXAMPLES 1 TO 8

Magnetic recording media were produced in the same way as in Example 1 except that magnetic particles and binder resins shown in Table 1 were used in the manufacture of the magnetic recording media.

The magnetic characteristics of the magnetic recording media obtained are shown in Table 1.

When AQ29S or AQ38S was used as a binder resin instead of AQ55S, the similar results were obtained.

TABLE 1

| Examples and Comparative examples | Magnetic particles | | | | | | |
|---|---|---|---|---|---|---|---|
| | Kind | Major axial diameter (μm) | Aspect ratio (major axis/ minor axis) | BET Specific surface area | Coercive force (Oe) | Saturation magnetization (emu/g) | Resin adsorption (wt %) |
| Example 1 | Co-coated acicular γ-FE$_2$O$_3$ particles (Co content: 4.21 wt %) | 0.18 | 6.0 | 40.8 | 840 | 76.8 | 1.89 |
| Example 2 | Co-coated acicular γ-FE$_2$O$_3$ particles (Co content: 2.36 wt %) | 0.22 | 7.0 | 34.8 | 683 | 78.6 | 1.85 |
| Example 3 | Acicular iron-based alloy magnetic particles | 0.15 | 6.0 | 48.2 | 1518 | 138.4 | 1.80 |
| Example 4 | Plate-like Ba ferrite particles | Plate diameter 0.05 | Plate diameter/ thickness 5.0 | 49.6 | 725 | 61.9 | 1.81 |
| Comparative example 1 | Same Co-coated acicular γ-Fe$_2$O$_3$ particles as those in Example 1 | | | | | | 1.55 |
| Comparative example 2 | Same Co-coated acicular γ-Fe$_2$O$_3$ particles as those in Example 1 | | | | | | 0.48 |
| Comparative example 3 | Same Co-coated acicular γ-Fe$_2$O$_3$ particles as those in Example 2 | | | | | | 1.50 |
| Comparative example 4 | Same Co-coated acicular γ-Fe$_2$O$_3$ particles as those in Example 2 | | | | | | 0.47 |
| Comparative example 5 | Same Co-coated acicular γ-Fe$_2$O$_3$ particles as those in Example 3 | | | | | | 1.59 |
| Comparative example 6 | Same Co-coated acicular γ-Fe$_2$O$_3$ particles as those in Example 3 | | | | | | 1.04 |
| Comparative example 7 | Same Co-coated acicular γ-Fe$_2$O$_3$ particles as those in Example 4 | | | | | | 1.27 |
| Comparative example 8 | Same Co-coated acicular γ-Fe$_2$O$_3$ particles as those in Example 4 | | | | | | 0.70 |

| Examples and Comparative examples | Manufacture of magnetic recording medium Kind of resin | Characteristics of magnetic recording medium | | | |
|---|---|---|---|---|---|
| | | Coercive force (Oe) | Residual flux density (Gauss) | Squareness ratio (Br/Bm) | Degree of orientation |
| Example 1 | AQ55S (produced by Eastman Kodak) | 915 | 1880 | 0.883 | 3.07 |
| Example 2 | AQ55S (produced by Eastman Kodak) | 758 | 1937 | 0.891 | 3.32 |
| Example 3 | AQ55S (produced by Eastman Kodak) | 1523 | 2728 | 0.880 | 2.93 |
| Example 4 | AQ55S (produced by Eastman Kodak) | 838 | 1505 | 0.877 | — *3 |
| Comparative example 1 | Vyron-280 *1 (produced by Toyo Spinning Co., Ltd.) | 924 | 1530 | 0.843 | 2.63 |
| Comparative example 2 | VAGH *2 (produced by U.C.C., Ltd.) | 898 | 1200 | 0.699 | 2.60 |
| Comparative example 3 | Vyron-280 *1 (produced by Toyo Spinning Co., Ltd.) | 755 | 1803 | 0.862 | 3.03 |
| Comparative example 4 | VAGH *2 (produced by U.C.C., Ltd.) | 732 | 1670 | 0.777 | 2.67 |
| Comparative | Vyron-280 *1 | 1519 | 2588 | 0.859 | 2.36 |

TABLE 1-continued

| | | | | | |
|---|---|---|---|---|---|
| example 5 | (produced by Toyo Spinning Co., Ltd.) | | | | |
| Comparative example 6 | VAGH *2 (produced by U.C.C., Ltd.) | 1460 | 1069 | 0.568 | 1.27 |
| Comparative example 7 | Vyron-280 *1 (produced by Toyo Spinning Co., Ltd.) | 781 | 1250 | 0.776 | — *3 |
| Comparative example 8 | VAGH *2 (produced by U.C.C., Ltd.) | 740 | 883 | 0.563 | — *3 |

*1 Polyester produced by using a dicarboxylic acid containing a sulfonic acid metal base, as a copolymerizing component
*2 Vinyl chloride-vinyl acetate-vinyl alcohol copolymer
*3 Not determined

What is claimed is:

1. A magnetic recording medium comprising a substrate, and a magnetic recording layer composed of a coating composition containing a binder resin and magnetic particles, said binder resin being a polyester having an iminosulfonyl group.

2. A magnetic recording medium according to claim 1, wherein the weight ratio of said magnetic particles to said binder resin in the magnetic recording layer is 75:25 to 92:8.

3. A magnetic recording medium according to claim 1, wherein the average number molecular weight of said polyester is 10,000 to 40,000.

4. A magnetic recording medium according to claim 1, wherein said magnetic recording layer further contains not more than 7 wt % of additives.

5. A magnetic recording medium comprising a substrate, and a magnetic recording layer composed of a coating composition containing a binder resin and magnetic particles, said binder resin being a polyester having an iminosulfonyl group and a specific surface area of said magnetic particles being not less than 30 m²/g.

6. A magnetic recording medium according to claim 5, wherein the weight ratio of said magnetic particles to said binder resin in the magnetic recording layer is 75:25 to 92:8.

7. A magnetic recording medium according to claim 5, wherein the average number molecular weight of said polyester is 10,000 to 40,000.

8. A magnetic recording medium according to claim 5, wherein said magnetic recording layer further contains not more than 7 wt % of additives.

* * * * *